(12) United States Patent
Childers et al.

(10) Patent No.: US 10,698,153 B2
(45) Date of Patent: Jun. 30, 2020

(54) INDEX-MATCHED GRATING INSCRIPTION THROUGH FIBER COATING

(71) Applicant: Intuitive Surgical Operations, Inc., Sunnyvale, CA (US)

(72) Inventors: Brooks Childers, Christiansburg, VA (US); Megan Patoskie, Blacksburg, VA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 17 days.

(21) Appl. No.: 16/251,653

(22) Filed: Jan. 18, 2019

(65) Prior Publication Data

US 2019/0227225 A1 Jul. 25, 2019

Related U.S. Application Data (60) Provisional application No. 62/619,560, filed on Jan. 19, 2018.

(51) Int. Cl.
*G02B 6/02* (2006.01)

(52) U.S. Cl.
CPC ......... *G02B 6/02138* (2013.01); *G02B 6/021* (2013.01); *G02B 6/02128* (2013.01); *G02B 6/02142* (2013.01); *G02B 2006/02161* (2013.01)

(58) Field of Classification Search
None
See application file for complete search history.

(56) References Cited

U.S. PATENT DOCUMENTS

| | | | |
|---|---|---|---|
| 6,249,624 B1 | 6/2001 | Putnam et al. | |
| 6,298,184 B1 | 10/2001 | Putnam et al. | |
| 7,772,541 B2 | 8/2010 | Froggatt et al. | |
| 7,781,724 B2 | 8/2010 | Childers et al. | |
| 8,400,620 B2 | 3/2013 | Froggatt et al. | |
| 8,531,655 B2 | 9/2013 | Klein et al. | |
| 8,773,650 B2 | 7/2014 | Froggatt et al. | |
| 9,568,670 B2 | 2/2017 | Feder et al. | |
| 9,784,569 B2 | 10/2017 | Froggatt et al. | |
| 2002/0172483 A1* | 11/2002 | MacChesney | G02B 6/02 385/124 |
| 2006/0013523 A1 | 1/2006 | Childlers et al. | |

(Continued)

OTHER PUBLICATIONS

Application Note, femtoFBG, A Versatile Machine Optimized for the Fabrication of Fiber Bragg Gratings (FBGs) by Femtosecond Laser Direct-Writing, Newport, DS-011701, 2017, 12 pages.

(Continued)

*Primary Examiner* — Jerry Rahll
(74) *Attorney, Agent, or Firm* — Schwegman Lundberg & Woessner, P.A.

(57) ABSTRACT

When a grating is inscribed in a section of optical fiber through a coating of the optical fiber, using a light modulation mask to modulate the light beam that writes the grating, a fluid can be situated between the section of optical fiber and the back side of a mask component carrying the light modulation mask (e.g., on its front side) to reduce the refractive-index discontinuity encountered at the surface of the coating. In various embodiments, rather than running the fiber through a vessel containing the fluid, the fluid is run across the back side of the mask component or retained by capillary action between the fiber section and the mask component.

16 Claims, 5 Drawing Sheets

(56) References Cited

U.S. PATENT DOCUMENTS

| | | | |
|---|---|---|---|
| 2014/0232997 A1* | 8/2014 | Feder | G03F 1/00 |
| | | | 355/18 |
| 2014/0233888 A1* | 8/2014 | Feder | G02B 6/021 |
| | | | 385/37 |
| 2014/0233890 A1* | 8/2014 | Feder | G02B 6/02128 |
| | | | 385/37 |
| 2017/0370705 A1 | 12/2017 | Froggatt et al. | |

OTHER PUBLICATIONS

Vertut, Jean and Phillipe Coiffet, Robot Technology: Teleoperation and Robotics Evolution and Development, English translation, Prentice-Hall, Inc., Inglewood Cliffs, NJ, USA 1936, vol. 3A, 332 pages.

* cited by examiner

INDEX-MATCHED GRATING INSCRIPTION THROUGH FIBER COATING

CROSS-REFERENCE TO RELATED APPLICATION

This application claims priority to, and the benefit of, U.S. Provisional Patent Application No. 62/619,560, filed on Jan. 19, 2018, which is hereby incorporated herein by reference in its entirety.

TECHNICAL FIELD

This disclosure relates generally to the inscription of gratings into optical fibers through fiber coatings, and more specifically to reducing the refractive-index difference between air and the fiber coating during the inscription.

BACKGROUND

Optical fibers can be used as distributed optical sensors in many applications, for instance, to measure strain or temperature along the fiber, or determine the three-dimensional fiber shape from simultaneous bend, twist, and axial-strain measurements. Fiber shape sensing is useful, for example, in robotic surgery, where collocating a robotically operated surgical tool with the end of the shape-sensing optical fiber allows to precisely determine the location of the tool within the patient's body based on a measurement of the three-dimensional fiber shape. To use an optical fiber as a sensor, the fiber is interrogated by sending light down the fiber and measuring reflections received from various locations along the fiber; the spectral characteristics of the reflected light generally provide information about local fiber properties, such as local temperature or strain. For the purpose of creating a well-defined spectral reflection profile that facilitates such measurements, optical fiber cores are often inscribed with fiber Bragg gratings variations in the refractive index of the core that form a distributed. Bragg reflector. For periodic refractive-index variations, the grating exhibits a narrow reflection band at a wavelength that is twice the periodicity of the grating. Fiber Bragg gratings can be created by exposing a photosensitive fiber core (e.g., made of germanium-doped silica) to intense ultraviolet (UV) light, causing index changes in the exposed regions that depend on the intensity and duration of the exposure. The desired pattern of index variation can be achieved by creating a corresponding intensity pattern of the UV light, e.g., using two-beam interference at or near the fiber core, or a light modulation mask (or "photomask") placed between the UV light source (generally a laser) and the fiber.

Optical fibers are often surrounded by a protective coating that prevents, e.g., scratches and other damage to the surface of the fiber cladding. Since many industry-standard coatings do not transmit UV light, the process for inscribing fiber Bragg gratings used to involve stripping a pre-fabricated coated fiber, and recoating the fiber following the inscription. The increased cost and risk of fiber damage that are associated with these added manufacturing steps spurred the use of other formulations that are at least partially UV transparent, such as silicone. In conjunction with methods to increase the photosensitivity of the fiber core, such as boron co-doping, these more UV-transparent coatings allow fiber Bragg gratings to be written through the coating. The fiber coatings may, however, get scratched, and such scratches can partially block the UV light beam used to inscribe the grating, distorting the grating or preventing its creation.

SUMMARY

Described herein are methods, systems, and apparatus for using an index-matching fluid to reduce, during the inscription of a grating into a section of optical fiber, the refractive-index discontinuity that the grating-writing UV beam encounters at the surface of a fiber coating, and to thereby diminish the optical power of any defects on the fiber coating. The term "index-matching" is herein broadly used in reference to any decrease in the refractive-index difference at the surface of the fiber coating, i.e., it is not limited to perfect matching, but also includes any "partial matching," of the refractive index. Accordingly, any fluid whose refractive index differs from that of the fiber coating by less than the refractive index of air (which determines the refractive-index mismatch in the absence of the fluid) can generally serve as an index-matching fluid. Examples of index-matching fluids include glycerin, alcohol, and water.

In contrast to various conventional index-matching systems and methods, the approach described herein does not involve passing the optical fiber through a vessel containing the index-matching fluid. Rather, in various embodiments, the fluid is situated between the section of the optical fiber into which the grating is inscribed and the back side of a mask component used for the inscription, e.g., by using surface tension and adhesion to keep the fluid in place or flowing the fluid continuously down the back side of the mask component. The mask component is a thin plate with a light modulation mask (e.g., a phase mask or amplitude mask) formed on one side (or, alternatively, embedded in the plate without being exposed on the plate surface), and the "back side" of the mask component herein refers to the side of the plate that does not expose the light modulation mask. Beneficially, by avoiding the need to contain the fluid in a vessel and run the optical fiber through that vessel to wet the fiber, systems and apparatus for wetting the fiber can be kept simple and cost-efficient.

In one aspect, a method of inscribing a coated optical fiber includes situating a fluid (such as, e.g., alcohol) between a section of the optical fiber and a first surface of a mask component without containing the fluid in a vessel, and directing light through a light modulation mask integrated in the mask component (and not exposed on the first surface, which corresponds to the "back side" of the mask component), the fluid, and the coating of the optical fiber to inscribe a grating into the section of the optical fiber. The index of refraction of the fluid differs from the index of refraction of the coating by a first amount, the index of refraction of air differs from the index of refraction of the coating by a second amount, and the first amount is less than the second amount. In some embodiments, the index of refraction of the fluid differs from the index of refraction of the coating by no more than about 12%. The coating may be made of an at least partially UV-transparent polymer. The mask component has, in some embodiments, a thickness of less than 2 mm. Example thicknesses less than 2 mm include thicknesses of 1.5 mm, 1 mm, and less than 1 mm.

Situating the fluid between the section of the optical fiber and the first surface of the mask component may include wetting the section of the optical fiber. For example, the optical fiber may be pulled across the first surface of the mask component, and the section of the optical fiber may be wetted by applying the fluid to the optical fiber at a location that immediately precedes the mask component as the fiber is pulled across the first surface to thereby cause the fluid to wick between the optical fiber and the first surface of the mask component.

Alternatively, the fluid may be situated between the section of the optical fiber and the first surface of the mask component by flowing the fluid across the first surface of the mask component. For example, the mask component may be oriented substantially vertically and the fluid may be dispensed onto the first surface from above. The flow rate may be adjusted to ensure complete and continuous wetting between the section of the optical fiber the first surface of the mask component. In some embodiments, the mask component is held in a mask holder that includes a reservoir located above the mask component, wherein the reservoir is filled with the fluid and drains the fluid through a slit at the bottom of the reservoir, the slit substantially coinciding with the mask component in a horizontal plane of projection.

In another aspect, a system for inscribing a grating into a coated optical fiber through a fiber coating of the optical fiber includes a mask component including an integrated light modulation mask not exposed on a first surface of the mask component; a mechanism for pulling an optical fiber across the first surface of the mask component; and a fluid dispenser configured to apply a fluid to at least one of the first surface of the mask component or the optical fiber to situate the fluid between a section of the optical fiber adjacent the mask component and the first surface of the mask component without retaining the fluid in a vessel. The mask component may be oriented substantially vertically, and the fluid dispenser may be positioned above the mask component substantially aligned with the first surface of the mask component. Alternatively, the fluid dispenser may be positioned to wet the coated optical fiber in a region of the coated optical fiber preceding the section adjacent the mask component. The fluid dispenser may include a control mechanism for adjusting the rate with which the fluid is dispensed. The system may further include an ultraviolet laser configured and positioned to generate a light beam that propagates through the mask component and the fiber coating to create the grating in the section of the optical fiber.

In another aspect, a mask holder for dispensing a fluid from above onto a first surface, but not a second surface, of a mask component includes a block defining a window therethrough that extends from a front surface of the block to a back surface of the block; a clamping mechanism for securing the second surface of the mask component against the back surface of the block overlapping the window; and a fluid receptacle extending into the block from a top surface of the block, the receptacle opening towards the back surface of the block via a slit located above the window, wherein placement of the mask component underneath the slit exposes the first surface of the mask component to fluid flowing out of the fluid receptacle through the slit. An O-ring may be embedded in the back surface of the block surrounding the window, and the clamping mechanism may secure the second surface of the mask component against the O-ring, which then prevents exposure of the second surface of the mask component to the fluid. The mask holder may further include a shroud extending from the front surface of the block surrounding the window; a fluid collection trough extending from the back surface of the block underneath the window; and/or a shutter adjustably extending through a side surface of the block into the window to define an adjustable aperture in front of the second surface of the mask component.

BRIEF DESCRIPTION OF THE DRAWINGS

The foregoing will be more readily understood from the following description of various example embodiments, in particular, when taken in conjunction with the accompanying drawings, in which.

DETAILED DESCRIPTION

Figure 1A:
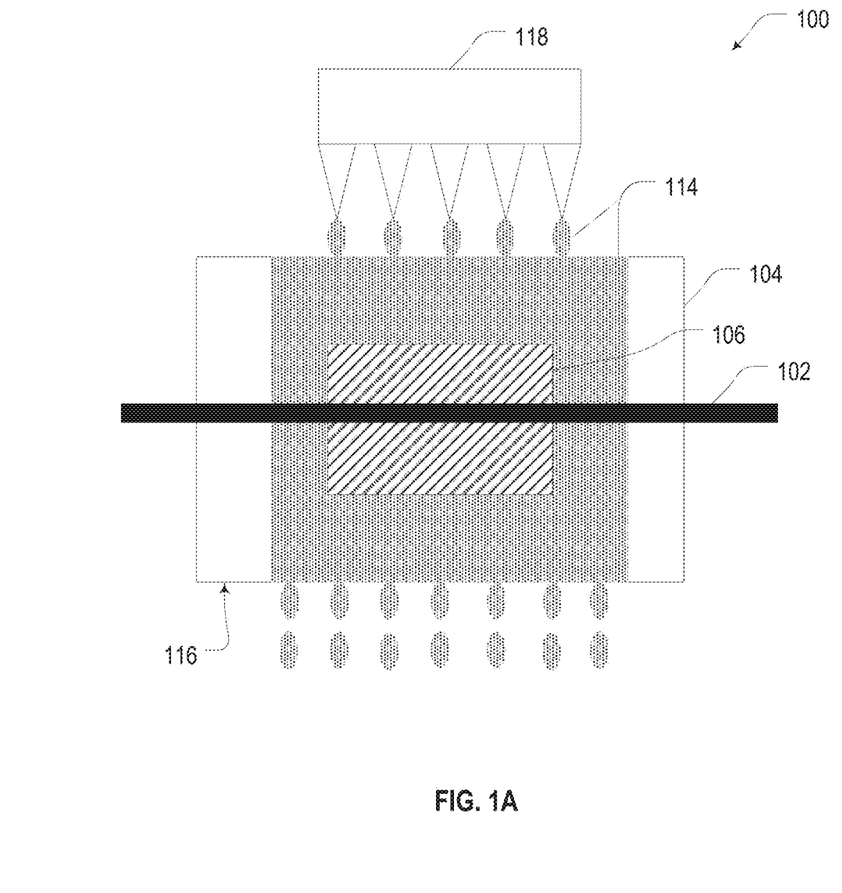
FIGS. 1A and 1B are schematic side and front views, respectively, of an example arrangement for situating a fluid between a section of an optical fiber and a back side of a mask component by flowing the fluid across the back side of the mask component, in accordance with various embodiments.
Figure 1B:
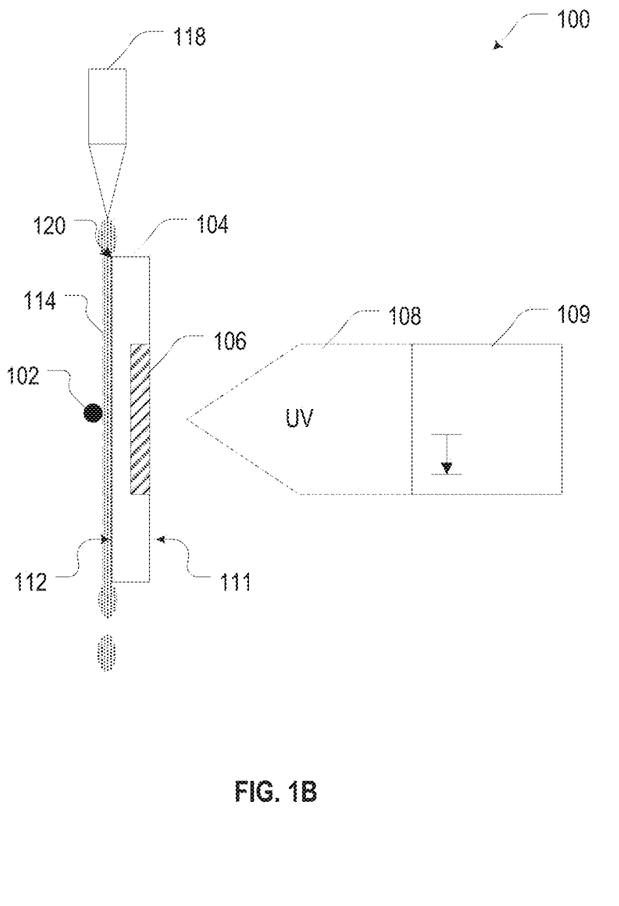

FIGS. 1A and 1B are schematic side and front views, respectively, of an example arrangement 100 for situating a fluid between a section of an optical fiber 102 and a mask component 104 without running the optical fiber through a vessel holding the fluid, in accordance with various embodiments. In this arrangement 100, the optical fiber 102 is placed adjacent the mask component 104, either in physical contact with the mask component 104 or in close proximity thereto. The fiber includes one or more fiber cores embedded in a cladding, and the cladding is surrounded by a coating that is at least partially transparent to UV light; the coating may be made of a polymer such as, e.g., silicone or certain UV-transparent formulations of acrylate or fluoroacrylate. The mask component 104 includes an integrated light modulation mask 106, which may be a phase mask or a (binary) amplitude mask as are well-known in the art. The light modulation mask 106 exhibits variations in thickness (as schematically illustrated) and/or opacity that create two (or more) diverging, but overlapping beams from the incoming UV beam 108 emitted by a UV laser 109, forming an intensity distribution in the overlap region that serves to create the desired grating in the core of the optical fiber 102. In use, the UV beam 108 enters the mask component 104 through one surface, herein referred to as the "front side," 111, and exits it through the opposite surface, herein referred to as the "back side," 112. The fiber 102 is placed adjacent the back side 112 of the mask component 104. The light modulation mask 106 may, as shown, be exposed on the front side 111 of the mask component 104. It is, however, also conceivable to implement the light modulation mask 106 entirely internally to the mask component 104 (e.g., using embedded materials with an index of refraction that differs from the index of the bulk of the mask component 104), without exposing the mask 106 on either surface 111, 112 of the mask component 104. In various embodiments, the thickness of the mask component 104 is limited, e.g., to less than 2 mm, such a 1.5 mm, 1 mm, no more than 1 mm, or less than 1 mm. A thin mask component 104 serves to accommodate a UV laser source with limited spatial coherence, as well as to limit the propagation distance of the two beams generated by the mask 106 to the fiber core, and thereby increase or maximize the overlap between the two beams.

In accordance with various embodiments, to reduce the refractive-index discontinuity that the UV light beam 108, after having passed through the mask component 104, encounters as it enters the coating of the optical fiber 102, an index-matching fluid 114 is situated between the fiber 102 and the back side 112 of the mask component 104. Depending on the residual refractive-index difference between the fluid and the fiber coating, the optical power (which is proportional to the refractive-index difference and the curvature of the surface of the coated fiber) of any scratches or other defects in the fiber coating is reduced to varying degree. With silicone (which has a refractive index of 1.40) as a fiber coating, using isopropyl alcohol (with a refractive index of 1.43) for index matching, for instance, can reduce the optical power by about 92.5%, and simply using water (with a refractive index of 1.36) achieves a 90% reduction in the optical power; glycerol (which has a refractive index of 1.56) results in a negative residual refractive-index difference that reduces the optical power by 60%.

As shown in FIGS. 1A and 1B, where the mask component 104 is oriented vertically (i.e., upright), the fluid 114 may be dispensed from above and flow down across the back side 112 of the mask component 104, dripping off the bottom edge 116, where it may optionally be collected in a fluid collection trough (not shown). The fluid dispenser 118 used for this purpose may dispense fluid 114 along the entire width of the light modulation mask 106 (as shown) so as to ensure complete wetting between the fiber 102 and the mask component 104 in the region of the light modulation mask 106, and may be positioned directly above and substantially aligned with the top edge 120 of the back side 112 of the mask component 104, such that projections of the fluid dispenser 118 (or, more precisely, the line along which the fluid leaves the fluid dispenser 118) and the back side 112 of the mask component 104 into a horizontal plane substantially coincide (allowing for some difference in length, e.g., the projection of the mask component 104 being longer than the projection of the fluid dispenser 118). (Using Cartesian coordinates with x- and y-axes spanning the horizontal plane and the z-axis extending vertically, a projection into the horizontal plane can be achieved mathematically by setting the z-component of the coordinates that describe the locations of the line along which the fluid is dispensed and the back side of the mask component to zero. The projected lines resulting in the x-y-plane substantially coincide fall on top of one another.) The positioning of the fluid dispenser 118 above the back side 112 serves to prevent fluid from running down the front side 111 of the mask component 104, where it would interfere with the function of the light modulation mask 106 (if the mask 106 is exposed on the front side 111) due to undesirable index-matching at the surface of the light modulation mask 106. Note that, although the fluid dispenser 118 is shown with multiple discrete fluid-dispensing openings, this is merely one non-limiting embodiment, and other fluid-dispensing mechanisms may be employed. In one alternative embodiment, for instance, fluid is dispensed from a fluid reservoir above the mask component 104 through a slit at the bottom of the reservoir, as explained in more detail below with reference to FIGS. 3A-4B.

Figure 2A:
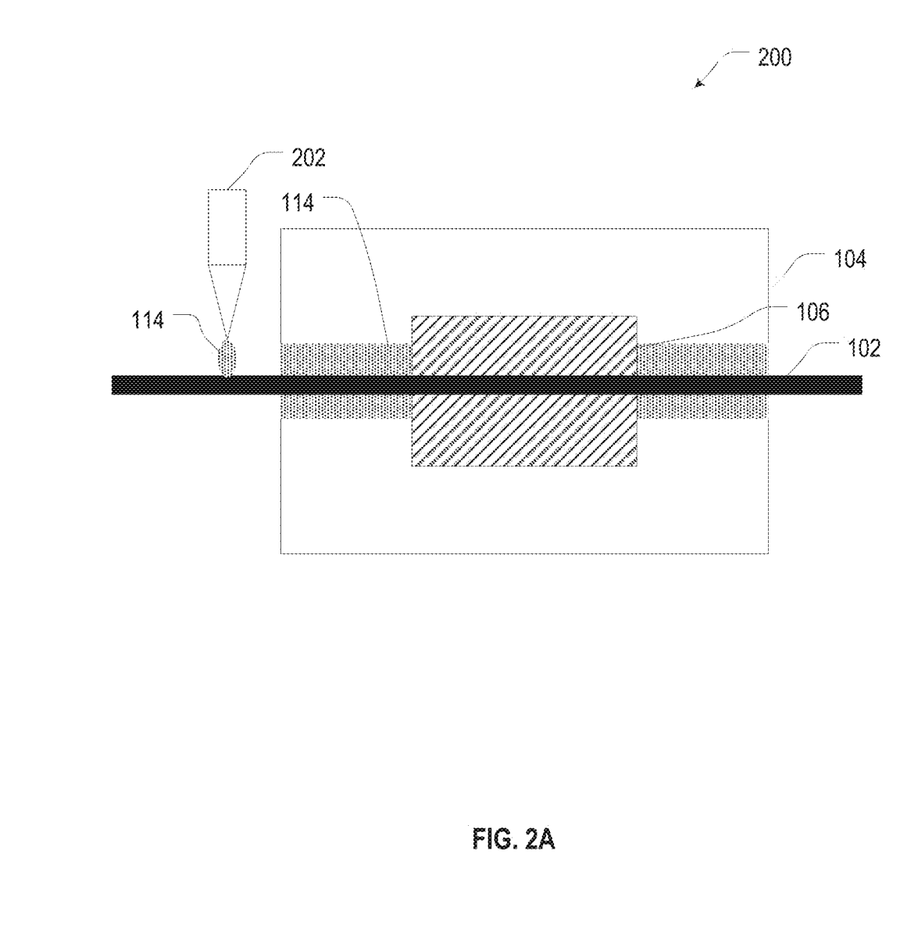
FIGS. 2A and 2B are schematic side and front views, respectively, of an example arrangement for situating a fluid between a section of an optical fiber and a back side of a mask component by applying fluid to the fiber in a location immediately preceding the mask component, in accordance with various embodiments.
Figure 2B:
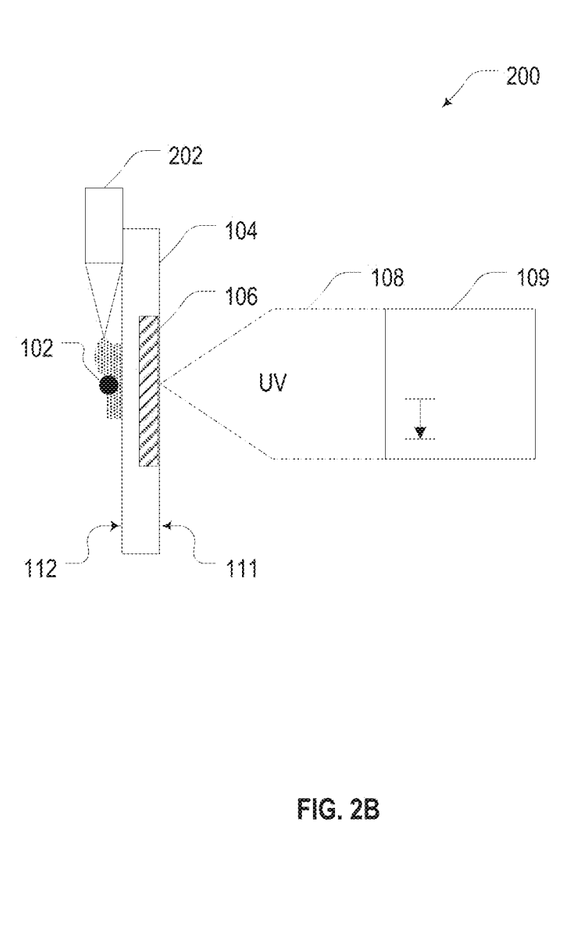

FIGS. 2A and 2B illustrate, in schematic side and front views, respectively, an alternative example arrangement 200 for situating a fluid 114 between a section of an optical fiber 102 and a back side 112 of a mask component 104, in accordance with various embodiments. Herein, the optical fiber 102, mask component 104, and UV laser 109 are arranged in the same manner as in FIGS. 1A and 1B, but the fluid dispenser 202 is positioned differently. Rather than dispensing fluid onto the back side 112 of the mask component 104, the fluid dispenser 202 applies fluid 114 directly to the optical fiber 102, in a region of the fiber 102 immediately preceding the mask component 104. As the fiber 102 is pulled across the back side 112 of the mask component 104 (using a mechanism not shown in this figure), the fluid 114 wicks between the fiber 102 and the mask component 104, such that the section of the optical fiber 102 that is, at any given time, directly in front of the light modulation mask 106 (and into which the grating is inscribed) is wetted as a result of capillary action (a combination of surface tension of the fluid 114 and adhesive forces between the fluid 114 and the optical fiber 102 and between the fluid 114 and the mask component 104). In some embodiments, the wicking may be very efficient, resulting in little to no dripping of excess fluid. Capillary action may also be exploited with an arrangement more similar to that of FIGS. 1A and 1B, to allow use of a fluid dispenser, placed above the top edge of the back side 112 of the mask component 104, that does not extend across the entire width of the light modulation mask 106, but is located approximately above the side of the light modulation mask 106 where the optical fiber 102 enters as it is pulled across the mask component 104.

In both arrangements 100, 200, the fluid dispenser may include a suitable control mechanism to adjust the rate with which the fluid is dispensed to ensure that the relevant section of the optical fiber is continuously wetted. Such a control mechanism may, for instance, utilize an adjustable valve to control the flow rate, or, in embodiments where the fluid is driven out the bottom of a reservoir by gravity (as described below with respect to FIGS. 3A-4B), the fill height of the reservoir.

While the arrangements 100, 200 utilize a mask component 104 oriented upright, the disclosed subject is generally not limited to this particular orientation. The mask component 104 may, for example, be oriented horizontally, with its back side 112 facing up and the section of the optical fiber 102 placed on top. In embodiments where the fluid is flown across the back side 112 of the mask component 104, a vertical orientation of the mask component is beneficial in that it exploits gravity to move the fluid 114.

Figure 3A:
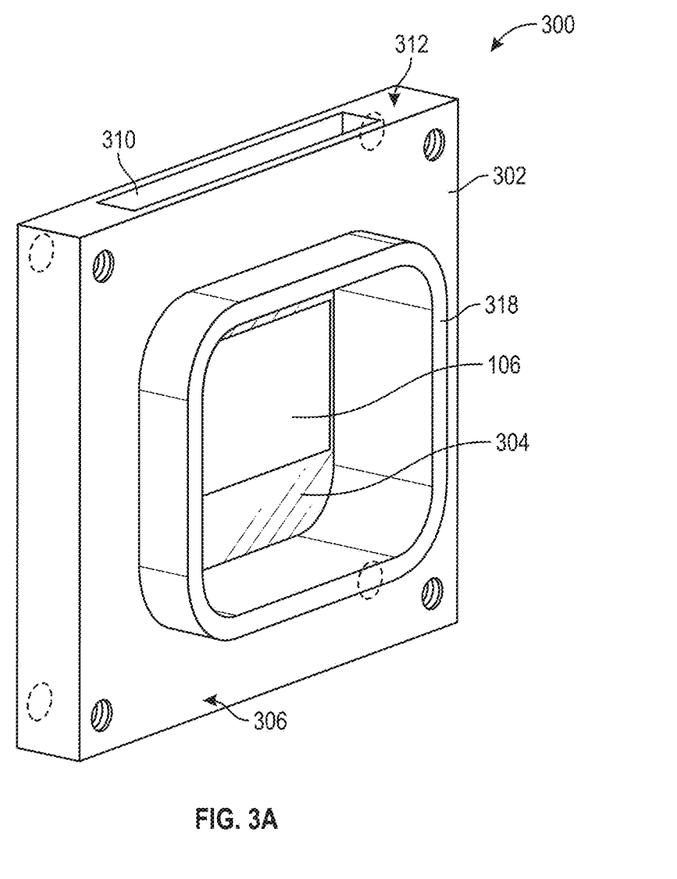
FIGS. 3A and 3B are front and back perspective views, respectively, of an example mask holder in accordance with various embodiments.
Figure 3B:
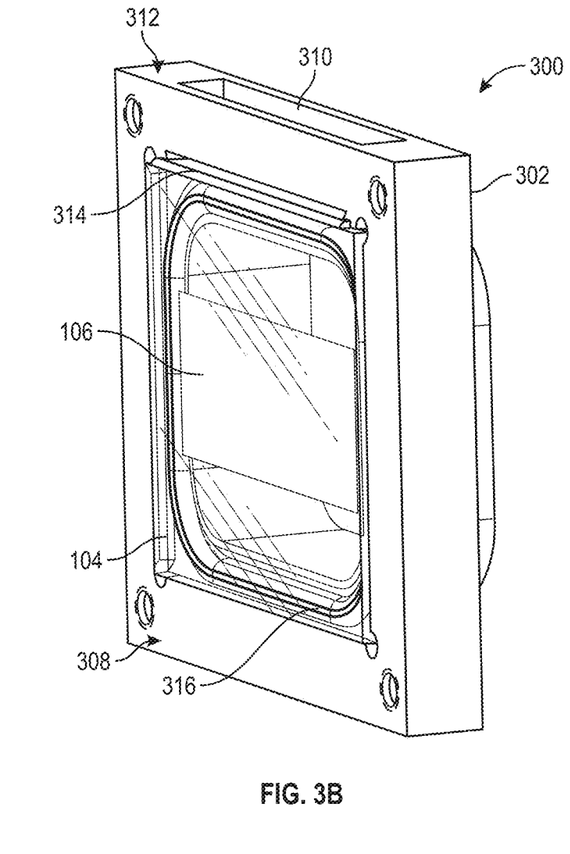

With reference now to FIGS. 3A and 3B, an example mask holder 300 implementing an arrangement for dispensing fluid from above onto the back side of the mask component (as conceptually illustrated in FIGS. 1A and 1B) is shown in perspective views taken from the front and back of the mask holder 300, respectively. The mask holder 300 includes a block 302 (e.g. made of metal or plastic) that defines a window 304 extending through the block 302 from a front surface 306 to a back surface 308. The mask component 104 is secured against the back surface 308 of the block 302 overlapping the window 304, using a clamping mechanism as illustrated, e.g., in FIGS. 4A and 4B (described below). The mask component 104 is oriented within the mask holder 300 such that the light modulation mask 106 faces the front surface 306 of the mask holder 300 (or, put differently, the front side 111 of the mask component 104 is closer to the front surface 306 of the mask holder 300 than the back side 112 of the mask component 104).

The mask holder 300 includes a fluid receptacle 310 formed in the block 302, extending downward from the top surface 312 of the block 302. In use, the fluid receptacle 310 is filled with an index-matching fluid to form a fluid reservoir. The fluid receptacle 310 opens toward the back surface 308 of the block 302 via a slit 314 located at or near the bottom of the fluid receptacle 310 above the window 304 and the mask component 104, allowing fluid to drain from the reservoir and flow down the back side of the mask component 104. When projected into a horizontal plane of projection, the slit 314 substantially coincides with the back side of the mask component 104 (allowing for a slight lateral offset due to the thickness of the mask component). For instance, as shown, the slit 314 may be substantially horizontal and extend in parallel with the top edge of the mask component 104 across the width of the light modulation mask 106. Optionally, the back surface 308 of the block 302 may include a shallow recess formed therein, and the mask component 104 may be seated within and secured against the recessed portion of the back surface 308 to bring the back side of the mask component 104 in the same plane as the non-recessed portion of the back surface 308 of the block 302. To prevent fluid from seeping around the edge of the mask component and reaching the front side of the mask component 104, where the light modulation mask 106 may be exposed, an O-ring 316 may be embedded in the back surface 308 of the block 302 (or, if applicable, the recessed portion formed therein) surrounding the window 304, and the front side of the mask component 104 may be secured against the O-ring 316. By sealing the contact area between the front side of the mask component 104 and the back surface of the block 302, the O-ring prevents exposure of the front surface of the mask component to the fluid. The mask holder may further include a shroud 318 extending from the front surface 306 of the block surrounding the window to protect the front side of the mask component 104 from any fluid spilling over the top of the fluid receptacle 310.

Figure 4A:
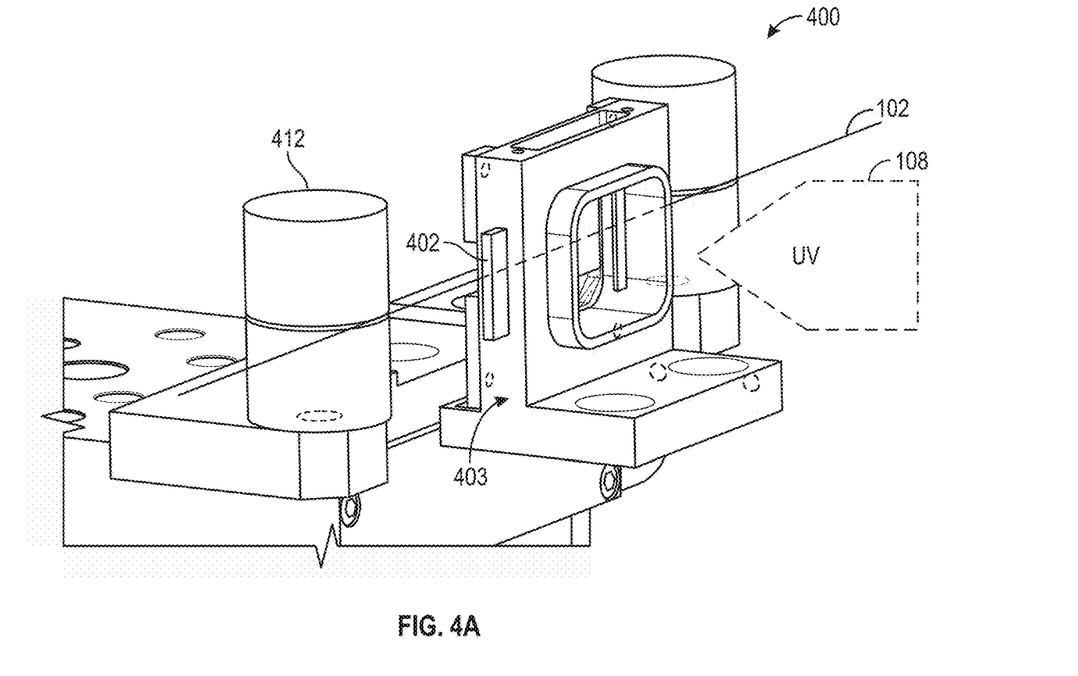
FIGS. 4A and 4B are front and back perspective views, respectively, of the example mask holder of FIGS. 3A and 3B in the context of a larger system for fiber inscription, in accordance with various embodiments.
Figure 4B:
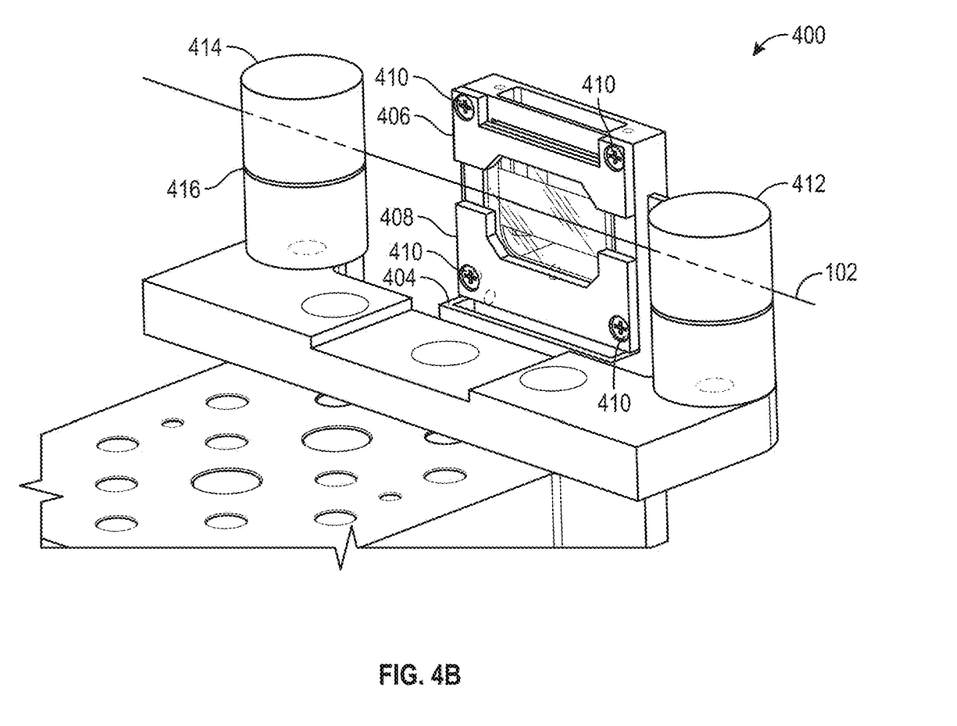

FIGS. 4A and 4B illustrate the example mask holder 300 of FIGS. 3A and 3B in the context of a larger system 400 for fiber inscription, in accordance with various embodiments, again in perspective views taken from the front and back, respectively. As shown in FIG. 4A, the mask holder 300 may include a shutter 402 (e.g., formed by a rectangular slab of metal or other material opaque to UV light) that extends movably through a side surface 403 of the block 302 into the window 304. By sliding the shutter 402 sideways, an adjustable aperture can be defined in front of the front side of the mask component 104, allowing the UV beam 108 (whose incoming direction is schematically shown) to be cropped for alignment with the light modulation mask 106. As best seen in FIG. 4B, the mask holder 300 may further include a fluid collection trough 404 extending from the back surface 308 of the block 302 underneath the window 304 to catch the index-matching fluid running off the mask component 104. FIG. 4B further illustrates an example clamping mechanism including two mask retainers 406, 408, secured with screws 410 to the back surface 308 of the block 302 (e.g., in the corners of the back surface), that press top and bottom portions of the mask component 104 against the back surface 308 of the block 302 to hold the mask component 104 in place. The mask retainers 406, 408 are shaped so as to not occlude the light modulation mask 106. The system 400 further includes two fiber guides 412, 414 located on both sides of the mask holder 300 to position the optical fiber 102 adjacent the back side of the mask component 104. As shown, the fiber guides 412, 414 may be cylindrical blocks that contain horizontal circular grooves 416 to retain the optical fiber 102. Note that, in the perspective of FIG. 4B, the fiber runs along the back side of the fiber guides 412, 414. In some embodiments, to pull the fiber 102 across the back side of the mask component 104, one end of the fiber is attached to a motorized linear stage and the other end is attached to a motorized spool.

Figure 5A:
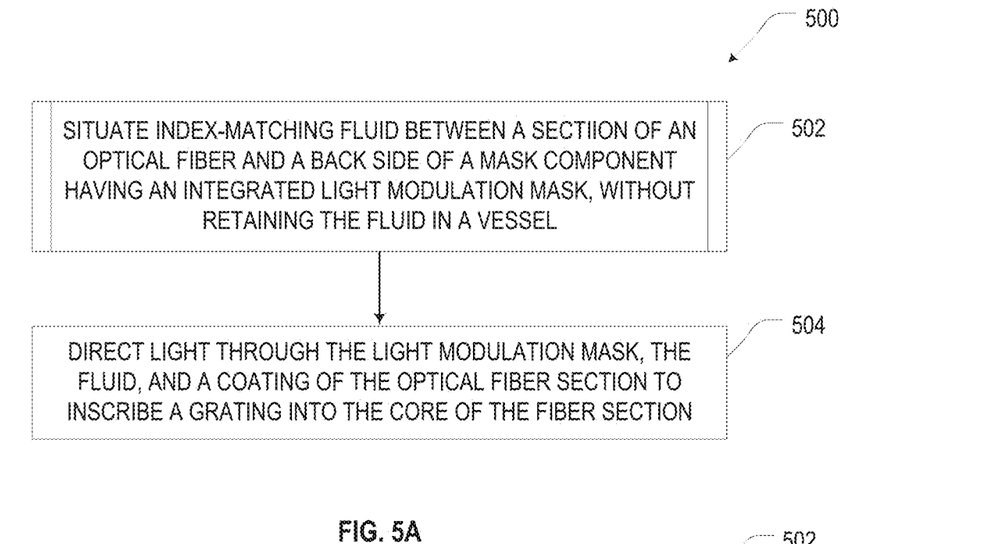
FIGS. 5A-5C are flow charts illustrating various methods for inscribing a coated optical fiber in accordance with various embodiments.
Figure 5B:
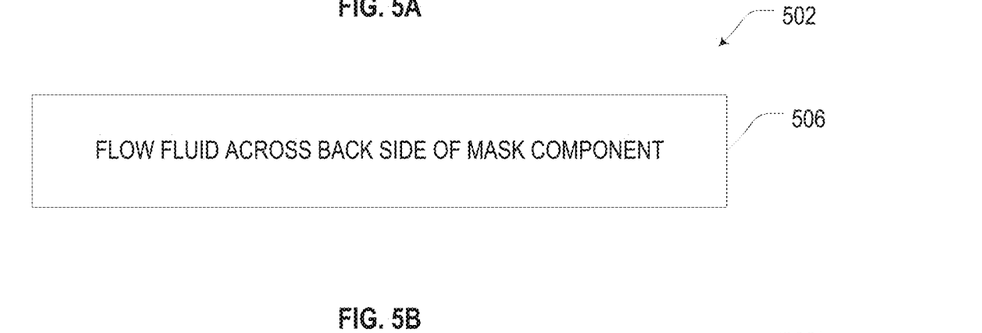
Figure 5C:
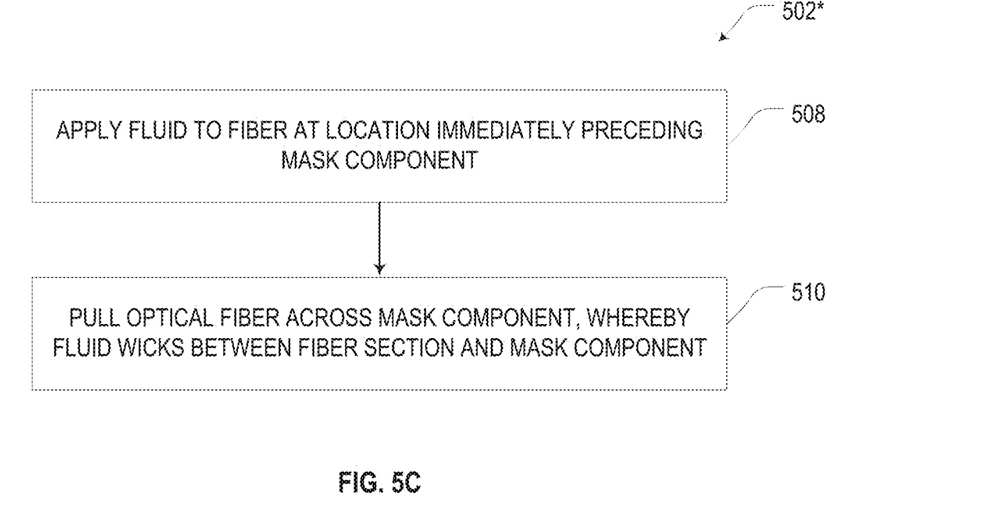

Having described various example embodiments of systems and apparatus for situating a fluid between a section of an optical fiber and a mask component while inscribing a grating into the section, various methods of using such systems and apparatus will now be summarized with reference to FIGS. 5A-5C. As shown in FIG. 5A, a method 500 of inscribing an optical fiber 102 in accordance herewith includes situating an index-matching fluid between a section of the optical fiber 102 and a back side of a mask component 104 without retaining the fluid (as situated between the fiber and mask component) in a vessel (operation 502). The mask component 104 has an integrated light modulation mask 106 that is not exposed at the back side of the mask component 104, and the method 500 further includes directing light through the light modulation mask, the fluid, and a coating of the optical fiber section to inscribe a grating into the core of the fiber section (operation 504). As will be appreciated by those of ordinary skill in the art, the fluid is applied immediately prior to, and remains situated between the optical fiber and the mask component during, the inscription of the grating, that is, operations 502, 504 occur substantially simultaneously.

In accordance with one embodiment, illustrated in FIG. 5B, situating the fluid between the optical fiber section and the mask component (operation 502) involves flowing fluid across the back side of the mask component (operation 506). In accordance with an alternative embodiment, illustrated in FIG. 5C, situating the fluid between the optical fiber section and the mask component (operation 502*, where the asterisk indicates the alternative implementation) is accomplished by applying the fluid to the optical fiber at a location immediately preceding the mask component (operation 508) as the fiber is pulled across the mask component (operation 510), causing the fluid to wick between the fiber section and the mask component.

While the presently disclosed approach to index-matching without containing the index-matching fluid in a vessel has been described in the context of inscribing a grating using a light modulation mask, various principles discussed herein can generally also be applied to grating inscription using two-beam interference. In this case, a simple, uniform plate may be substituted for the mask component to facilitate wicking of the fluid between the plate and the section of the optical fiber into which the grating is written. Further, in embodiments where the fluid is run across the back side of the mask component, the fiber coating may be sufficiently wetted even in the absence of a mask component or other plate.

While the disclosed subject matter has been described and explained herein with respect to various example embodiments, these examples are intended as illustrative only and not as limiting. Various modifications, additional combinations of features, and further applications of the described embodiments that do not depart from the scope of the subject matter may occur to those of ordinary skill in the art. Accordingly, the scope of the inventive subject matter is to be determined by the scope of the following claims and all additional claims supported by the present disclosure, and all equivalents of such claims.

What is claimed is:

1. A method of inscribing a coated optical fiber comprising:
situating a fluid between a section of the optical fiber and a first surface of a mask component without containing the fluid in a vessel, wherein an index of refraction of the fluid differs from an index of refraction of a coating of the optical fiber by a first amount, wherein an index of refraction of air differs from the index of refraction of the coating by a second amount, wherein the first amount is less than the second amount, and wherein the mask component comprises an integrated light modulation mask not exposed on the first surface of the mask component; and
directing light through the light modulation mask, the fluid, and a coating of the optical fiber to inscribe a grating into the section of the optical fiber.

2. The method of claim 1, wherein the index of refraction of the fluid differs from the index of refraction of the coating by no more than about 12%.

3. The method of claim 1, wherein the mask component has a thickness of less than 1 mm.

4. The method of claim 1, wherein situating the fluid between the section of the optical fiber and the first surface of the mask component comprises wetting the section of the optical fiber.

5. The method of claim 4, further comprising pulling the optical fiber across the first surface of the mask component, wherein the section of the optical fiber is wetted by applying the fluid to the optical fiber at a location that immediately precedes the mask component as the optical fiber is pulled across the first surface of the mask component to thereby cause the fluid to wick between the optical fiber and the first surface of the mask component.

6. The method of claim 1, wherein situating the fluid comprises flowing the fluid across the first surface of the mask component.

7. The method of claim 6, wherein the mask component is oriented substantially vertically and wherein flowing the fluid across the first surface of the mask component comprises dispensing the fluid onto the first surface from above.

8. The method of claim 7, wherein the mask component is held in a mask holder that comprises a reservoir located above the mask component, wherein the reservoir is filled with the fluid and drains the fluid through a slit at a bottom of the reservoir, the slit substantially coinciding with the mask component in a horizontal plane of projection.

9. The method of claim 6, further comprising adjusting a flow rate of the fluid to ensure complete and continuous wetting between the section of the optical fiber and the first surface of the mask component.

10. The method of claim 1, wherein the coating s made of an at least partially UV-transparent polymer.

11. The method of claim 1, wherein the fluid is alcohol.

12. A system for inscribing a grating into a coated optical fiber through a fiber coating of the optical fiber, the system comprising:
a mask component comprising an integrated light modulation mask not exposed on a first surface of the mask component;
a mechanism for pulling an optical fiber across the first surface of the mask component; and
a fluid dispenser configured to apply a fluid to at least one of the first surface of the mask component or the optical fiber to situate the fluid between a section of the optical fiber adjacent the mask component and the first surface of the mask component without retaining the fluid in a vessel.

13. The system of claim 12, further comprising an ultraviolet laser configured and positioned to generate a light beam that propagates through the mask component and the fiber coating to create the grating in the section of the optical fiber.

14. The system of claim 12, wherein the mask component is oriented substantially vertically and the fluid dispenser is positioned above the mask component substantially aligned with the first surface of the mask component.

15. The system of claim 12, wherein the fluid dispenser is positioned to wet the coated optical fiber in a region of the coated optical fiber preceding the section adjacent the mask component.

16. The system of claim 12, wherein the fluid dispenser comprises a control mechanism for adjusting a rate with which the fluid is dispensed.

* * * * *

UNITED STATES PATENT AND TRADEMARK OFFICE
CERTIFICATE OF CORRECTION

PATENT NO. : 10,698,153 B2
APPLICATION NO. : 16/251653
DATED : June 30, 2020
INVENTOR(S) : Childers et al.

Page 1 of 1

It is certified that error appears in the above-identified patent and that said Letters Patent is hereby corrected as shown below:

In Column 10, Line 8, in Claim 10, delete "s" and insert --is-- therefor

Signed and Sealed this
First Day of September, 2020

Andrei Iancu
*Director of the United States Patent and Trademark Office*